US012253056B2

(12) United States Patent
Atzkern

(10) Patent No.: US 12,253,056 B2
(45) Date of Patent: Mar. 18, 2025

(54) FUEL INJECTOR OF AN INTERNAL COMBUSTION ENGINE AND INTERNAL COMBUSTION ENGINE

(71) Applicant: MAN Energy Solutions SE, Augsburg (DE)

(72) Inventor: Thomas Atzkern, Augsburg (DE)

(73) Assignee: MAN Energy Solutions SE, Augsburg (DE)

( * ) Notice: Subject to any disclaimer, the term of this patent is extended or adjusted under 35 U.S.C. 154(b) by 0 days.

(21) Appl. No.: 18/649,387

(22) Filed: Apr. 29, 2024

(65) Prior Publication Data

US 2024/0369033 A1 Nov. 7, 2024

(30) Foreign Application Priority Data

May 3, 2023 (DE) ..................... 10 2023 111 353.4

(51) Int. Cl.
*F02M 61/18* (2006.01)
*F02M 61/14* (2006.01)

(52) U.S. Cl.
CPC ........ *F02M 61/1886* (2013.01); *F02M 61/14* (2013.01); *F02M 2200/85* (2013.01)

(58) Field of Classification Search
CPC . F02M 61/1886; F02M 61/14; F02M 2200/85
USPC ........................ 239/294, 533.12; 137/533.17
See application file for complete search history.

(56) References Cited

U.S. PATENT DOCUMENTS 4,040,569 A * 8/1977 Knapp .................. F02M 51/08 239/585.4
4,613,081 A * 9/1986 Bauer ................ F02M 51/0614 239/585.4
4,958,771 A * 9/1990 Klomp .................. F02M 61/08 239/453
6,363,915 B1 * 4/2002 Cohen ................ F02M 51/0671 239/533.11
7,699,242 B2 * 4/2010 Mochizuki ............ F02M 61/20 239/584

(Continued)

FOREIGN PATENT DOCUMENTS

DE 3342213 9/1984
DE 3421074 12/1984

(Continued)

OTHER PUBLICATIONS

Office Action of corresponding German Patent Application No. 10 2023 111 353.4.

*Primary Examiner* — Mahmoud Gimie
(74) *Attorney, Agent, or Firm* — COZEN O'CONNOR

(57) ABSTRACT

A fuel injector that supplies fuel to a cylinder, having a casing (11) for mounting, a valve body interacting with a valve seat, acting on a valve stem, for opening a fuel flow, away from the casing or towards the outside, a guide and seat body having a guide portion and a seat portion mounted to the casing. The guide portion of the guide and seat body guides the valve stem The seat portion of the guide and seat body provides the valve seat. The guide portion of the guide and seat body is flowed about by fuel. The seat portion of the guide and seat body is flowed through by the fuel. The guide portion and the seat portion an intermediate portion of the guide and seat body having a recess is formed, via which the fuel is conducted from the guide portion towards the seat portion.

10 Claims, 3 Drawing Sheets

(56) References Cited

U.S. PATENT DOCUMENTS

| | | | | |
|---|---|---|---|---|
| 2005/0189440 | A1* | 9/2005 | Cooke | F02M 45/086 239/584 |
| 2013/0048751 | A1* | 2/2013 | Dian | F02D 41/2096 239/91 |
| 2013/0153675 | A1* | 6/2013 | Kronberger | F02M 61/168 239/1 |

FOREIGN PATENT DOCUMENTS

| | | |
|---|---|---|
| DE | 102018217768 | 4/2020 |
| FR | 1177753 | 4/1959 |
| WO | WO 02086309 | 10/2002 |

* cited by examiner

FUEL INJECTOR OF AN INTERNAL COMBUSTION ENGINE AND INTERNAL COMBUSTION ENGINE

BACKGROUND OF THE INVENTION

1. Field of the Invention

The disclosure relates to a fuel injector of an internal combustion engine. Further, the invention relates to an internal combustion engine.

The disclosure relates in particular to the field of so-called large engines or large internal combustion engines, the cylinders of which have piston diameters of at least 140 mm, in particular of at least 175 mm. Such large internal combustion engines are in particular marine engines.

2. Description of Related Art

Large internal combustion engines designed as gas engines, liquid fuel combustion engines, or as dual-fuel engines are known from practice. In liquid fuel combustion engines, a liquid fuel, such as for example a diesel fuel is combusted. In gas combustion engines, a gaseous fuel, such as for example natural gas is combusted. In dual-fuel engines, a liquid fuel can be combusted in a first operating mode and a gaseous fuel in a second operating mode.

To supply fuel to the cylinders of the internal combustion engine, internal combustion engines comprise fuel injectors. By way of a fuel injector, the fuel can be directly introduced into a combustion space or a combustion chamber of a cylinder or into a pre-chamber of the cylinder interacting with the combustion space or the combustion chamber or into an intake pipe leading to the cylinder.

Fuel injectors comprise a casing, via which the respective fuel injector can be mounted to an internal combustion engine. Further, fuel injectors comprise a valve body acting on a valve stem, which valve body interacts with a valve seat. Dependent on the relative position between valve body and valve seat, a fuel flow is either opened or blocked.

Fuel injectors having a valve body opening towards the outside or a valve body opening towards the inside are basically distinguished in fuel injectors. In the case of a fuel injector with a valve body opening towards the outside, the valve body, for opening a fuel flow, can be moved in a direction away from the casing or based on the casing in the direction towards the outside. In the case of a fuel injector with a valve body opening towards the inside, the valve body, for opening the fuel flow, by contrast, can be moved based on the casing, in the direction towards the inside into the casing. The invention relates to a fuel injector having a valve body opening towards the outside for opening the fuel flow.

SUMMARY OF THE INVENTION

There is a need for a fuel injector with a valve body opening towards the outside, which in an open state with low installation space requirement provides as large as possible a flow cross-section for the fuel.

One aspect of the present invention is a new type of fuel injector of an internal combustion engine and an internal combustion engine having such a fuel injector.

The fuel injector comprises a casing via which the fuel injector can be mounted to the internal combustion engine. Further, the fuel injector comprises a valve body interacting with a valve seat acting on a valve stem, which valve body, for opening a fuel flow, can be moved in the direction away from the casing or based on the casing in the direction towards the outside. Further, the fuel injector comprises a guide and seat body, which comprises a guide portion and a seat portion, and which is mounted to the casing. The guide portion of the guide and seat body guides the valve stem. The seat portion of the guide and seat body provides the valve seat. The guide portion of the guide and seat body can be flowed about by fuel. The seat portion of the guide and seat body can be flowed through by the fuel. Between the guide portion and the seat portion an intermediate portion of the guide and seat body having at least one recess is formed, via which the fuel can be conducted from the guide portion in the direction of the seat portion.

With minimal installation space requirement, the fuel injector according to the invention provides a large flow cross-section for fuel. In particular, a relatively small outer diameter of the fuel injector in particular in a region below the guide portion or, seen in the flow direction of the fuel, downstream of the guide portion, is sufficient for providing a large flow cross-section. The guide function for the valve stem and the valve seat function for the valve body acting on the valve stem are both provided by the guide and seat body, which is preferentially in one piece or monolithical. On the one hand this makes possible a simple construction of the fuel injector while on the other hand a precise shape and position tolerance of the guide portion and the seat portion relative to one another during the manufacture can be achieved, since the guide portion and the seat portion are formed on the same component, namely on the guide and seat body. Since the guide and seat body are embodied as separate assembly relative to the casing, which is mounted to the casing, the casing and the guide and seat body can, with respect to the functions to be provided by the same, can be configured independently of one another.

Preferentially, the guide and seat body with the guide portion projects into the casing. This is preferred for providing a simple, compact design while providing as large as possible a flow cross-section.

Preferentially, the guide and seat body with the intermediate portion projects into the casing. This is also preferred for providing a compact, simple design while providing as large as possible a flow cross-section.

Preferentially, the guide and seat body with the seat portion projects out of the casing. This also serves for providing a simple and compact design and as large as possible a flow cross-section.

Preferentially, the fuel injector comprises a jet-cap, which at least partially encloses the seat portion radially on the outside. By way of the jet-cap, a fuel flow can be influenced in a targeted manner.

Preferentially, a union nut is screwed to the casing which holds or clamps the guide and seat body to the casing. This allows a simple fastening of the guide and seat body to the casing.

Preferentially, the guide and seat body is screwed to the casing, wherein via the screw-in depth of the guide and seat body into the casing, a stroke of the valve stem is adjustable. Thus it is possible to specifically adjust the stroke of the valve stem and thus a fuel flow with the valve body lifted off from the valve seat.

BRIEF DESCRIPTION OF THE DRAWINGS

Exemplary embodiments of the invention are explained in more detail by way of the drawing without being restricted to this. There it shows.

DETAILED DESCRIPTION OF THE PRESENTLY PREFERRED EMBODIMENTS

Figure 1:
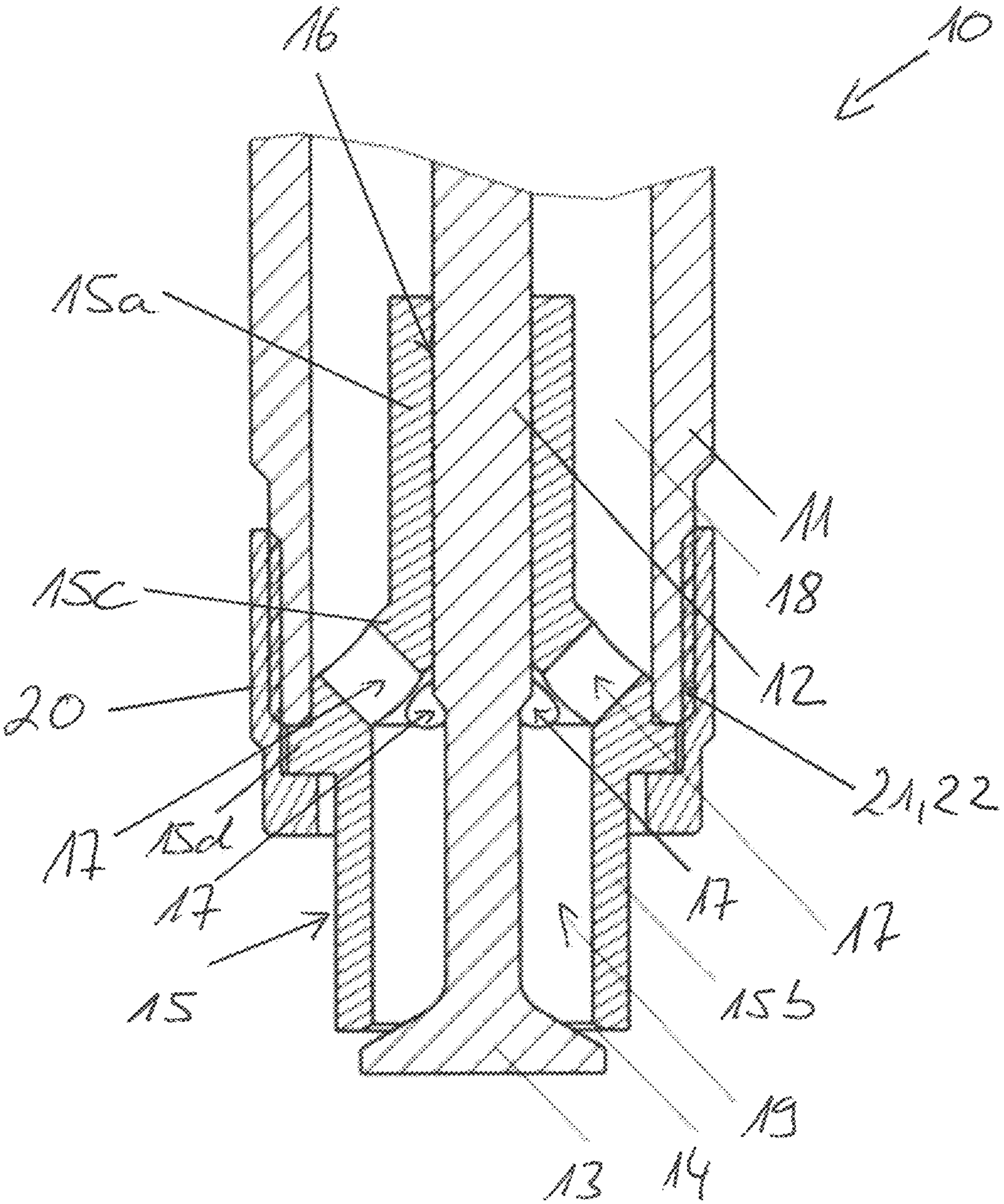
FIG. 1: is a schematic cross-section through a fuel injector of an internal combustion engine.

FIG. 1 shows a cross-section through a fuel injector 10 for an internal combustion engine according to the invention. The fuel injector 10 can be both a fuel injector for liquid fuel and also a fuel injector for gaseous fuel.

The fuel injector 10 is designed to supply fuel to a cylinder of the internal combustion engine, namely either directly into a combustion chamber of the cylinder or into a pre-chamber of the cylinder interacting with the combustion chamber or into a pipe of the internal combustion engine leading into the combustion chamber of the cylinder, which also carries combustion air to the cylinder.

The fuel injector 10 comprises a casing 11. By way of the casing 11, the fuel injector 10 can be mounted to the internal combustion engine, for example in the region of a cylinder head or a cylinder head cover.

Furthermore, the fuel injector 10 comprises a valve stem 12, which carries a valve body 13. The valve stem 12 can be directly actuated magnetically. The valve body 13 interacts with a valve seat 14. In particular when the valve body 13 lies against the valve seat 14, the fuel injector 10 does not allow any fuel flow. By contrast, when the valve body 13 is lifted off from the valve seat 14, the fuel injector opens a fuel flow.

Furthermore, the fuel injector 10 comprises a guide and seat body 15 with a guide portion 15*a* for the valve stem 12 and a seat portion 15*b* providing the valve seat 14. Relative to the casing 11, this guide and seat body 15 is embodied as separate, one-piece or monolithic assembly and mounted to the casing 11.

As already explained, the guide portion 15*a* of the guide and seat body 15 guides the valve stem 12, wherein for this purpose the valve stem 12 penetrates a recess 16 in the guide portion 15*a*. The seat portion 15*b* of the guide and seat body 15 provides the valve seat 14 for the valve body 13.

The guide portion 15*a* of the guide and seat body 15 can be flowed about by fuel. The seat portion 15*b* of the guide and seat body 15 by contrast can be flowed through by the fuel. Accordingly, when the valve body 13 is lifted off from the valve seat 14 and the fuel injector 10 opens a fuel flow, the fuel flows about the guide portion 15*a* and flows through the seat portion 15*b* of the guide and seat body 15.

Between the guide portion 15*a* and the seat portion 15*b*, an intermediate portion 15*c* of the guide and seat body is formed. In this intermediate portion 15*c*, at least one recess 17 is introduced, which can be flowed through by fuel, so that the fuel, with opened fuel injector 10, originating from the flowed-about guide portion 15*b*, can overflow into the flowed-through seat portion 15*b*.

The recesses 17 in the intermediate portion 15*c* of the guide and seat body 15 accordingly serve for conducting the fuel, originating from the guide portion 15*a*, in the direction of the seat portion 15*b* with opened fuel injector 10.

The guide and seat body 15 projects with its guide portion 15*a* into the casing 11. Between the casing 11 and the guide portion 15*a* an annular space 18 is formed, which with opened fuel injector 10 is flowed through by fuel, wherein this fuel flowing through the annular space 18 flows about the guide portion 15*a* on the outside.

Further, the intermediate portion 15*c* of the guide and seat body 15 also projects in the casing 11 in the shown exemplary embodiment, at least partially. By contrast, the seat portion 15*b* projects out of the casing 11 of the fuel injector 10, namely in FIG. 1 in such a manner that the valve seat 14 is positioned outside the casing 11.

The valve stem 12 does not only penetrate the guide portion 15*a*, but also the seat portion 15*b* of the guide and seat body 15, wherein between the valve stem 12 and the seat portion 15*b* an annular space 19 is formed, which with opened fuel injector 10 is flowed through by fuel. The fuel flowing through the annular space 19 likewise flows through the seat portion 15*b* and, partially, flows about the valve stem 12, namely that portion of the valve stem 12 which extends within the seat portion 15*b* of the guide and seat body 15.

The annular spaces 18 and 19 are coupled via the recesses 17.

It is provided, in particular, that the flow cross-sections for the fuel gradually decrease in the direction of the valve seat 14. Accordingly, the flow cross-section for the fuel is defined in the region of the guide portion 15*a* by an outer diameter of the guide portion 15*a* and an inner diameter of the casing 11. The flow cross-section in the region of the recesses 17 of the intermediate portion 15*c* of the guide and seat body 15 is defined by the diameter and the number of the recesses 17. The flow cross-section in the region of the seat portion 15 is defined by the inner diameter of the seat portion 15 and an outer diameter of the valve stem 12. In particular when the flow cross-sections in the flow direction of the fuel gradually decrease, pressure losses can be reduced.

In FIG. 1, the fuel injector 10, furthermore, comprises a union nut 20. The union nut 20 comprises an internal thread 21 which interacts with an external thread 22 of the casing 11. For fastening the guide and seat body 15 to the casing 11, the union nut 20 clamps a projection 15*d* of the guide and seat body 15 directed radially to the outside, which is formed between the intermediate portion 15*c* and the seat portion 15*b*, between the casing 11 and the union nut 20. By way of this clamping, a sealing function between the guide and seat body 15 and the casing 11 can be provided.

Casing 11 and guide and seat body 15 are preferentially produced from a metallic material, wherein in FIG. 1 the guide and seat body 15 is then clamped relative to the casing 11 in a metallically sealing manner.

The circumferential projection 15*d* of the guide and seat body 15 furthermore limits the introduction depth of the guide and seat body 15 into the casing 11.

Figure 2:
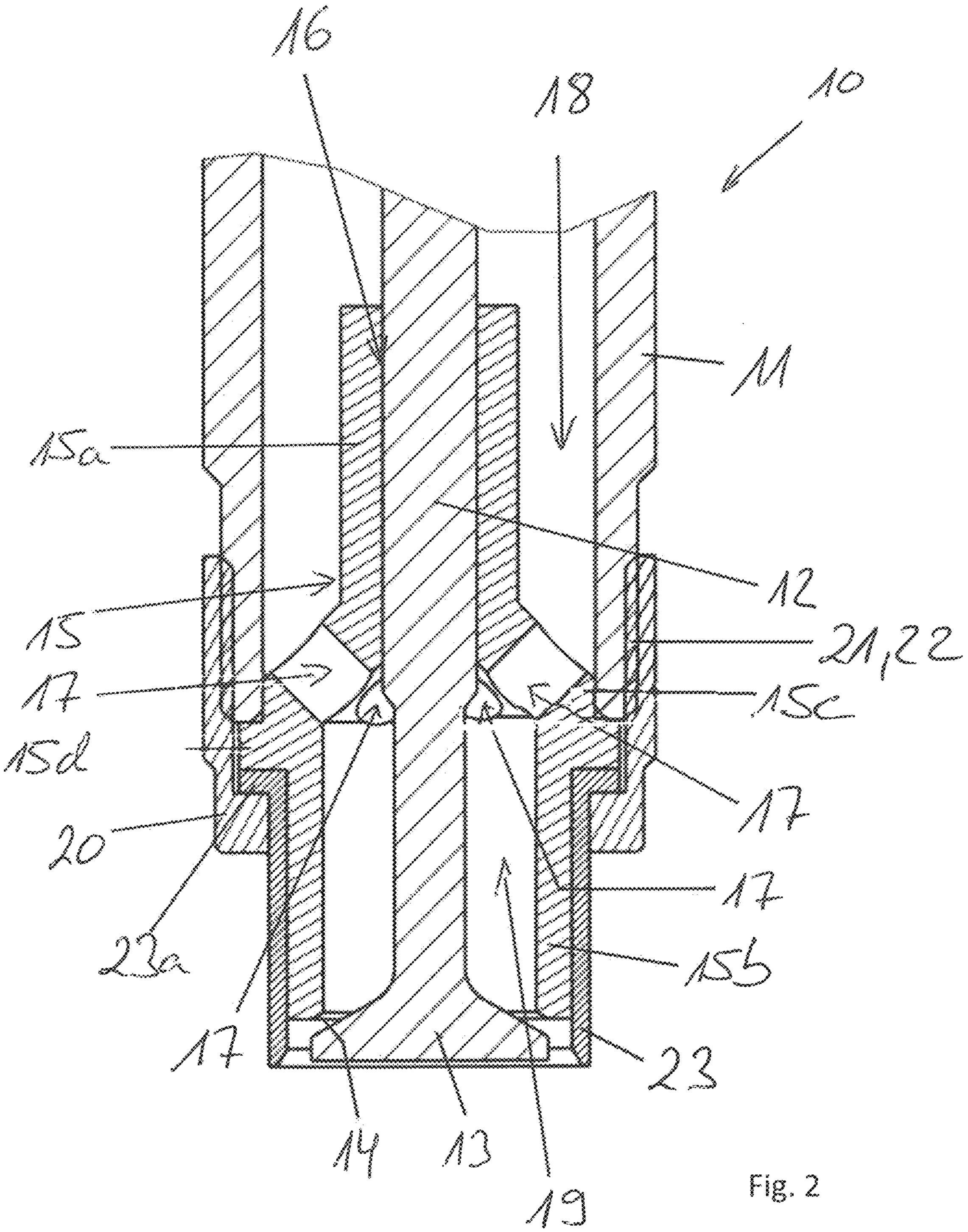
FIG. 2: is a schematic cross-section through a fuel injector of an internal combustion engine.

FIG. 2 shows the fuel injector 10 that additionally comprises a jet-cap 23. The jet-cap 23 surrounds the seat portion 15*b* of the guide and seat body 15 radially on the outside at least partially and projects over the valve seat 14. By way of such a jet-cap 23, the fuel jet flowing via the valve seat 14 can be shaped and specifically influenced.

According to FIG. 2, a circumferential collar 23*a* of the jet-cap 23, just as the guide and seat body 15, is likewise clamped with the help of the union nut 20 between the union nut 20 and casing 11. The circumferential collar 23*a* of the jet-cap 23 is positioned between the circumferential projection 15*d* of the guide and seat body 15 and the union nut 20, namely seen in the movement direction of the valve stem 12.

Here it is pointed out that the valve body 13 and the valve stem 12, during the opening of the fuel injector 10, i.e. during the lifting-off of the valve body 13 from the valve seat 14, opens towards the outside, i.e. is moved away from the casing 11. Accordingly, the fuel injector 10 is a fuel injector with a valve body 13 opening towards the outside.

Figure 3:
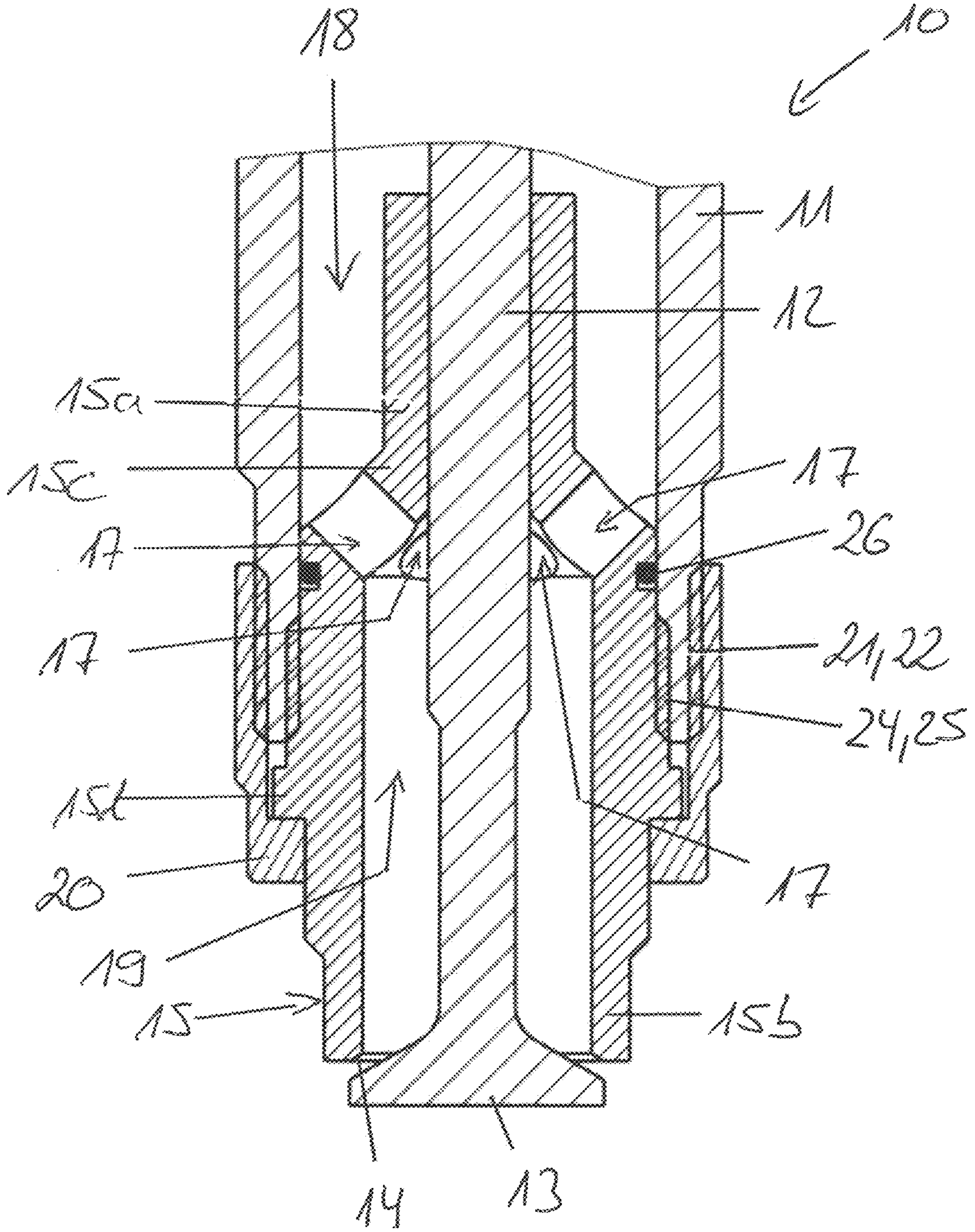
FIG. 3: is a schematic cross-section through a fuel injector of an internal combustion engine.

FIG. 3 shows the fuel injector 10, in which the guide and seat body 15 is screwed to the casing 11. Accordingly, the guide and seat body 15 comprises an external thread 24, which interacts with an internal thread 25 of the casing 11. By way of the screw-in depth of the guide and seat body 15 into the casing 11, a stroke of the valve stem 12 can be adjusted.

In FIG. 3, the sealing of the guide and seat body 15 relative to the casing 11 is effected via sealing element 26 formed as O-ring. The same is arranged in a groove of the guide and seat body 15.

The fuel injector 10 according to one aspect of the invention allows, with little installation space requirement, in particular with small outer diameter in particular in a region below or, seen in the flow direction of the fuel, downstream of the guide portion 15*a*, providing a large flow cross-section for the fuel. Central assembly of the fuel injector 10 is the guide and seat body 15, which comprises the guide portion 15*a* flowed about by fuel and the seat portion 15*b* flowed through by the fuel. By way of the recesses 17 in the intermediate portion 15*c*, the fuel, originating from the guide portion 15*a*, can overflow into the region of the seat portion 15*b*. The sealing of the guide and seat body 15 relative to the casing 11, can take place by a clamping and/or a sealing element 26 configured as O-ring.

In FIG. 3, a stroke adjustment for the stroke of the valve stem 12 is possible. While in FIGS. 1 and 2 the guide and seat body 15 is clamped to the casing 11, the guide and seat body 15 in FIG. 3 is screwed to the casing 11. Further, it is alternatively possible to connect the guide and seat body 15 to the casing 11 by welding.

The fuel injector 10 according to one aspect of the invention has a simple structure and can be cost-effectively produced. With little installation space requirement, it provides a large flow cross-section for the fuel. Preferentially, the fuel injector 10 is a fuel injector for gaseous fuel.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A fuel injector of an internal combustion engine configured to supply fuel to a cylinder of the internal combustion engine, comprising:

a casing, via which the fuel injector can be mounted to the internal combustion engine;

a valve stem;

a valve seat;

a valve body arranged at an axial end of the valve stem configured to interact with the valve seat and acting on the valve stem, the valve body, for opening a fuel flow, is movable in a direction away from the casing or, based on the casing, in a direction towards an outside;

a guide and seat body comprising:

a guide portion, wherein the guide portion and seat body guides the valve stem having a first internal diameter corresponding to an external diameter of the valve stem; and a seat portion having a second internal diameter that is larger than the first internal diameter mounted to the casing, wherein the seat portion of the guide and seat body provides the valve seat for the valve body, wherein the guide portion of the guide and seat body are configured to be flowed about by fuel, wherein the seat portion of the guide and seat body can be flowed through by the fuel; and an intermediate portion of the guide and seat body between the first internal diameter of the guide portion and the second internal diameter of the seat portion and having at least one recess, via which the fuel is configured to be conducted from the guide portion in the direction of the seat portion.

2. The fuel injector according to claim 1, wherein the guide and seat body with the guide portion projects into the casing.

3. The fuel injector according to claim 1, wherein the guide and seat body with the intermediate portion projects into the casing.

4. The fuel injector according to claim 1, wherein the guide and seat body with the seat portion projects out of the casing.

5. The fuel injector according to claim 1, further comprising:

a jet-cap, which encloses the seat portion at least partially radially on the outside.

6. The fuel injector according to claim 1, further comprising:

a union nut screwed to the casing, which holds or clamps the guide and seat body on the casing.

7. The fuel injector according to claim 6, wherein the guide and seat body is screwed to the casing, wherein via a screw-in depth of the guide and seat body into the casing, wherein a stroke of the valve stem is adjustable.

8. The fuel injector according to claim 1, wherein the guide and seat body is sealed relative to the casing.

9. The fuel injector according to claim 1, wherein the guide and seat body is formed in one piece or monolithically.

10. An internal combustion engine, comprising:

cylinders; and a fuel injector for each cylinder comprising:

a casing, via which the fuel injector can be mounted to the cylinders of the internal combustion engine;

a valve stem;

a valve seat;

a valve body arranged at an axial end of the valve stem configured to interact with the valve seat and acting on the valve stem, the valve body, for opening a fuel flow, is movable in a direction away from the casing or, based on the casing, in a direction towards an outside;

a guide and seat body comprising:

a guide portion, wherein the guide portion and seat body guides the valve stem; and a seat portion mounted to the casing, wherein the seat portion of the guide and seat body provides the valve seat for the valve body, wherein the guide portion of the guide and seat body are configured to be flowed about by fuel, wherein the seat portion of the guide and seat body can be flowed through by the fuel; and an intermediate portion of the guide and seat body between the guide portion and the seat portion and having at least one recess, via which the fuel is configured to be conducted from the guide portion in the direction of the seat portion.

* * * * *